UNITED STATES PATENT OFFICE.

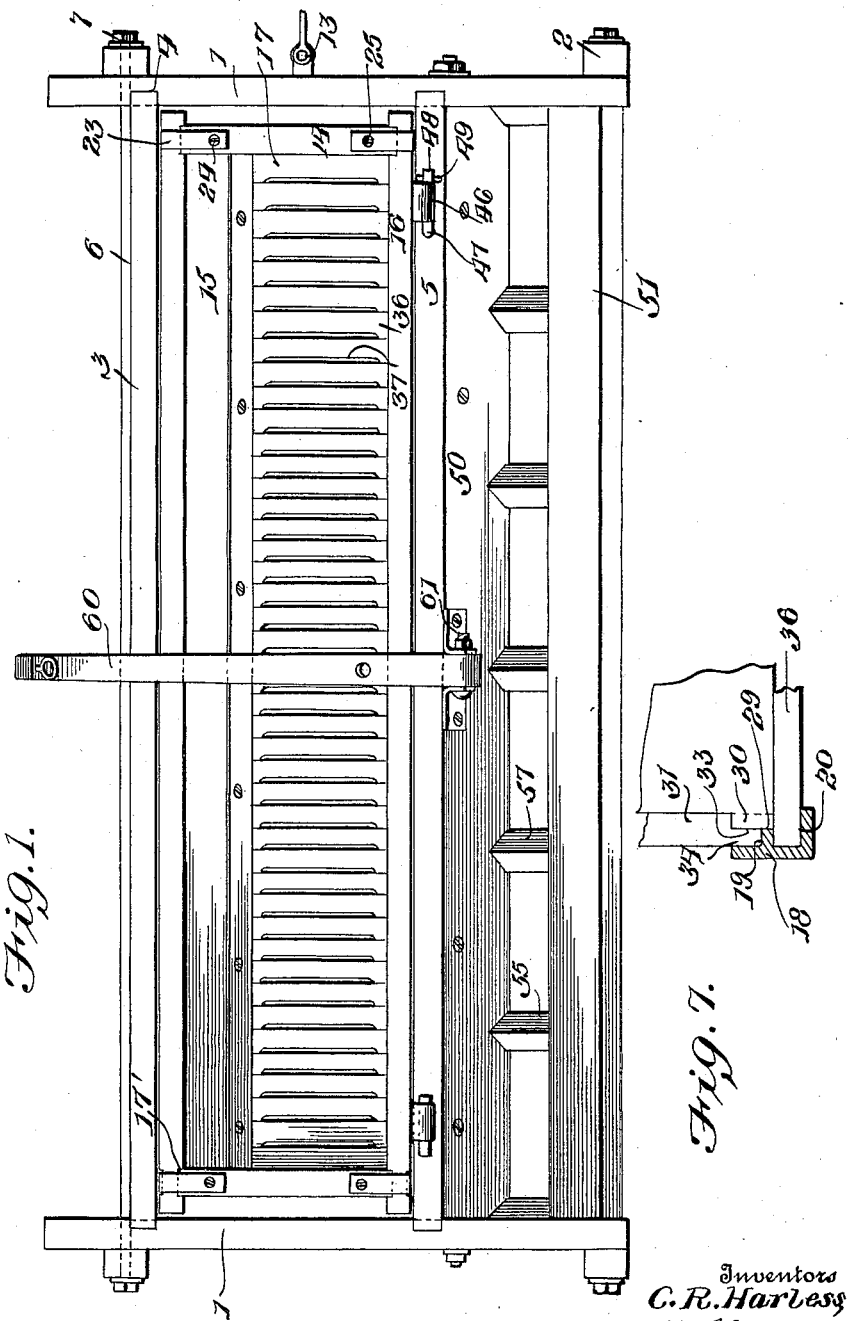

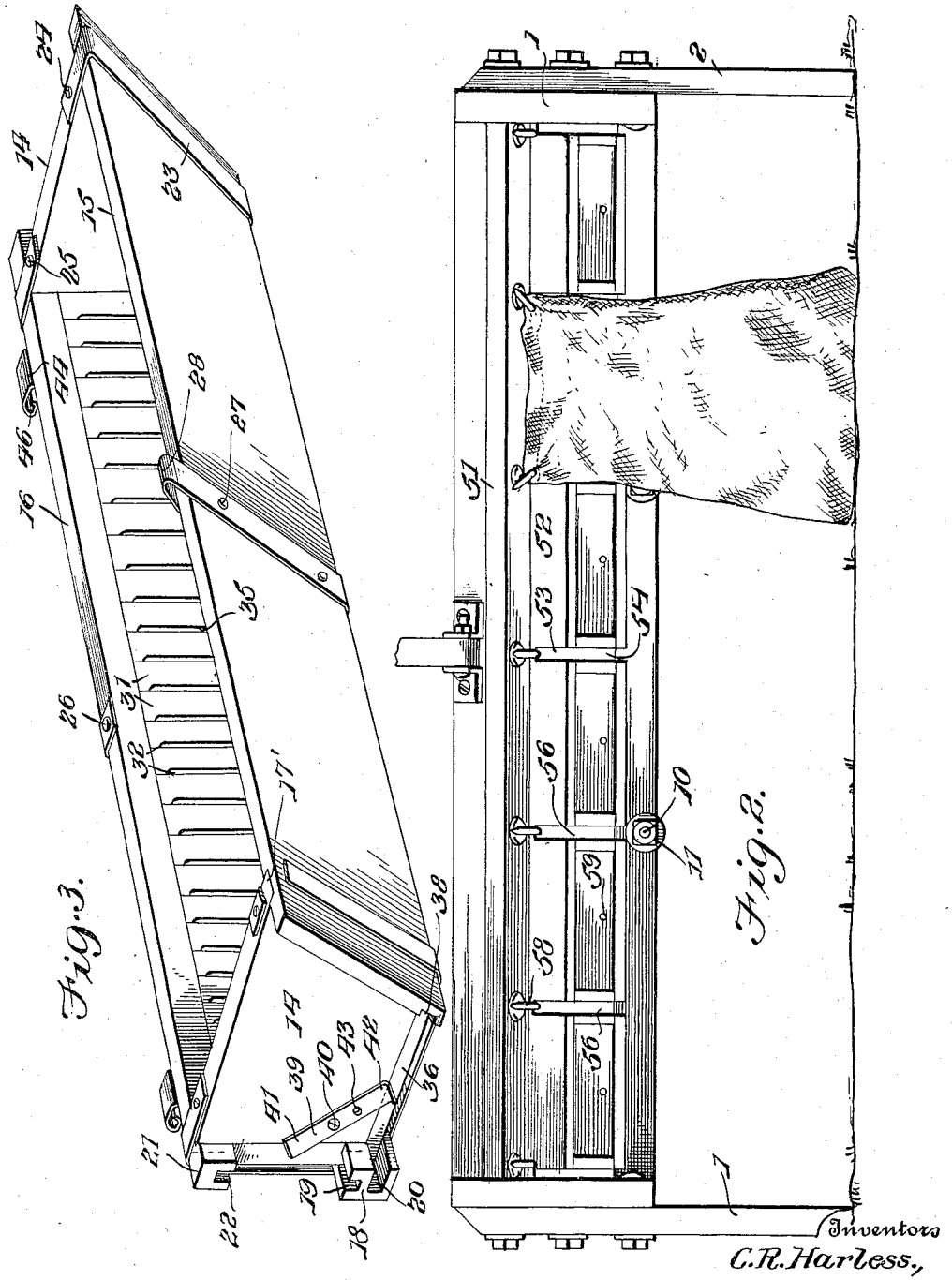

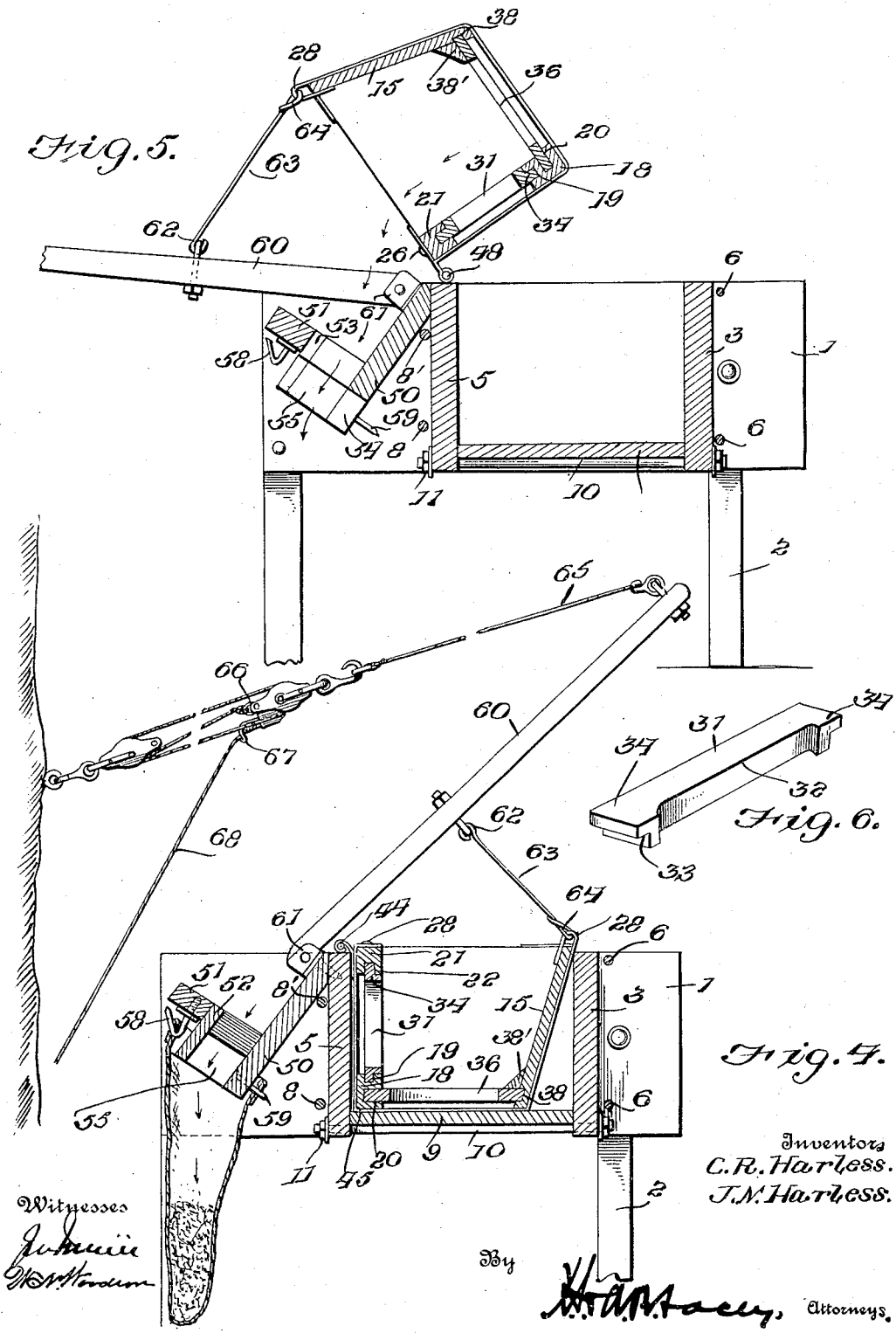

CHARLES R. HARLESS AND JASPER N. HARLESS, OF DAYTON, WASHINGTON.

MACHINE FOR TREATING GRAIN.

1,148,087. Specification of Letters Patent. Patented July 27, 1915.

Application filed July 17, 1914. Serial No. 851,570.

*To all whom it may concern:*

Be it known that we, CHARLES R. HARLESS and JASPER N. HARLESS, citizens of the United States, residing at Dayton, in the county of Columbia and State of Washington, have invented certain new and useful Improvements in Machines for Treating Grain, of which the following is a specification.

This invention relates to grain treating machines and more particularly to a machine for use in carrying out the blue vitriol or formaldehyde process of treating wheat, oats, barley, and other grain, for smutty or diseased conditions, and it is one aim of the invention to provide a machine for the purpose stated which may be readily operated and which will be adapted to treat a large quantity of grain at each operation and in a rapid and yet thorough manner.

The invention further has as its object to provide a grain treating machine for carrying out either of the processes, above mentioned, which machine will be adapted to first subject the grain to the blue vitriol or formaldehyde solution and then be capable of operation to thoroughly drain the grain and finally deposit the same in sacks.

Another aim of the invention is to so construct the machine that it may be operated by one person and yet be capable of treating a large quantity of grain at each operation.

In the accompanying drawings: Figure 1 is a top plan view of the machine embodying the present invention. Fig. 2 is a rear elevation thereof. Fig. 3 is a perspective view of the grain receiving trough of the machine. Fig. 4 is a vertical front to rear sectional view through the machine, illustrating the trough in position to subject the grain contained therein to the blue vitriol or formaldehyde solution. Fig. 5 is a view similar to Fig. 4, illustrating the trough partly moved to dumping position. Fig. 6 is a perspective view of one of the slats of the trough. Fig. 7 is a sectional view of the trough.

Corresponding and like parts are referred to in the following description and indicated in all the views of the accompanying drawings by the same reference characters.

The machine embodying the present invention includes a tank for holding the solution with which the grain is to be treated, a trough in which the grain is deposited for treatment and which is arranged to lie within the tank during the process of treatment and adapted to be elevated to permit of draining of the solution from the grain, and a hopper into which the grain is to be discharged from the trough, which hopper is arranged to support a number of bags or sacks to receive the grain.

In the drawings the numeral 1 indicates the two ends of the machine between which the tank and hopper are mounted and these ends 1 constitute the end walls of the tank and hopper, as will presently be made apparent. Legs 2 are secured in any suitable manner to the ends 1 and serve to support the machine. The forward wall of the tank is indicated by the numeral 3 and is secured at its ends in rabbets 4 in the opposing sides of the ends 1, the rear wall of the tank being indicated by the numeral 5 and being similarly mounted between the said ends 1. In order to securely hold the ends 1 against the ends of the front and back of the tank, tie-rods 6 are fitted at their ends through the ends 1 and extend transversely adjacent the upper and lower edges of the front wall 3, and these tie-rods also project through the forward legs 2 and are provided with the usual nuts 7. There are also provided, for the purpose stated, tie-rods 8 and 8' which are fitted through the ends 1 and which extend transversely in rear of the rear wall 5 of the tank. The bottom of the tank is indicated by the numeral 9 and in order to brace the said bottom, tie-rods 10 are fitted through the lower portions of the front and rear walls 3 and 5 and extend from front to rear beneath the said bottom and are tensioned by means of nuts 11. As before stated, the ends 1 constitute the end walls of the tank. In order that at the completion of the operation of treating the grain, the solution may be drained off from the tank, a plug or faucet 13 is provided preferably at one end wall of the tank.

The grain receiving trough includes end walls 14, a forward wall 15, a rear wall, indicated in general by the numeral 16, and a bottom, indicated in general by the numeral 17. The end walls and forward wall of the trough are imperforate but the rear wall and bottom thereof are foraminous to permit of the solution contained within the tank reaching the grain and further permit of the draining of the solution from the grain after the process of treatment has been completed. As stated, the rear wall and bottom of the trough are foraminous and each wall is preferably made up of a number of slats so formed and assembled as to form a grid, the slats comprising the bottom being supported between the front wall 15 and one of a pair of rails constituting the members of the rear wall 16 between which rails the slats of the rear wall are supported. In order that the trough may be readily moved into and out of the tank upon its supporting hinges, as will be presently explained, the forward wall 15 of the trough is inclined downwardly and inwardly and is formed adjacent its ends with gains 17' in which are fitted the forward edges of the end walls 14. The lower rail of the trough at the back thereof, is indicated by the numeral 18 and is formed in its upper side with a longitudinally extending groove 19 and in its forwardly presented side with a longitudinally extending groove 20. The upper rail is indicated by the numeral 21 and is formed in its under side with a longitudinally extending groove 22. In order to securely bind and hold the walls of the trough in assembled relation and also the rails 18 and 21, suitable lengths of strap metal 23 are secured each at one end, as at 24, to the upper edge of the respective end wall 14 and each is then extended downwardly beside the outer face of the forward wall 15 and rearwardly beneath the lower edge of the said wall and about the rail 18 and thence upwardly and about the rail 21, the other end of the strip being secured, as at 25, to the upper edge of the respective end wall 14. As a further means for bracing the walls of the trough, another suitable length of strap metal is provided and is secured at one end, as at 26, to the upper side of the rail 21 at a point midway between the ends thereof and is thence extended downwardly and beneath the rail 18 and thence forwardly and beneath the lower edge of the forward wall 15 and upwardly beside this wall and secured thereto in any suitable manner, as at 27. The other end of the strap is bent upon itself to form a loop 28 lying above the upper edge of the said forward wall 15 and serving as a connection for the means provided for binding the trough, as will be presently pointed out. In order that the rails 18 and 21 may be braced with relation to the end walls 14 of the trough, and vice versa, each rail is formed in its forwardly presented face and adjacent each end with a gain 29 and the rear edges of the end walls 14 are formed with tongues 30 which fit these gains. The slats comprising the back or rear wall 16 of the trough are indicated by the numeral 31 and one of these slats is clearly shown in Fig. 6 of the drawings. Each slat 31 has one lateral edge cut away or recessed as at 32, and the upper and lower end of each slat is rabbeted, as at 33, so as to provide tongues 34 which are slidably fitted in the grooves 19 and 22, as clearly shown in Figs. 3, 4 and 5 of the drawings. In assembling the slats between the rails, the slats are arranged edge to edge, the cut away edge of each slat, being disposed against the straight edge of the adjacent slat so that relatively narrow slots 35 are formed between the slats to permit of the flow of the solution into the trough and the draining of the solution therefrom. The slats comprising the bottom of the trough are indicated by the numeral 36 and, as in the case of the slats 31, each of the slats 36 has one lateral edge cut away as at 37, the arrangement of the slats being the same as previously described. The inner face of the forward wall 15 of the trough is formed with a longitudinally extending groove 38 and the slats 36 are slidably fitted at their ends in this groove and in the groove 20. The slats 31 and 36 are preferably formed of wood, and inasmuch as when they are subjected to the solution they are liable to swell, means is provided for permitting of such swelling and for holding the series of slats in close contact with each other. The means mentioned consists of leaf-springs arranged one at each end of the trough, these springs being indicated by the numeral 39, and each being disposed diagonally of the lower rear corner of the respective end wall of the trough and secured in place by means of a screw 40 upon which the springs may have pivotal movement when it is desired to remove or replace any of the slats. Each spring projects at one end 41 beyond the rear edge of the respective end wall and bears at its said end against the adjacent end of the series of slats 31 and at its other end 42 projects below the lower edge of the respective end wall and bears against the adjacent end of the series of slats 36. It will now be apparent that the springs 39 serve, by bearing against the opposite ends of the two series of slats, to hold the slats in close relation to each other and yet permit of the expansion of either series due to swelling. It will also be apparent that either spring may be turned upon the screw 40 as a pivot, so as to permit of the removal of the slats. In order to hold each spring normally against such movement, a stop pin or screw 43 is secured through the springs adjacent the screw 40 and into the respective end wall of the trough.

In order that the trough may be so mounted as to permit of its being moved to position to permit of draining of the solution from the grain and to permit of the grain being dumped into the hopper of the machine, the trough is hingedly mounted upon the rear wall of the tank in a manner which will now be explained.

Suitable lengths of strap metal 44 are secured to the rear sides of the rails 18 and 21, the lower ends of the straps being bent to extend beneath the lower sides of the rails 18, as indicated by the numeral 45. The upper ends of the straps 44 are overturned upon themselves, as at 46, so as to form pintle eyes located at the upper and rear sides of the trough. Pintles 47 are secured in the upper edge of the rear wall 5 of the tank and have their pivot portions 48 projecting laterally toward one end of the tank, and into the pintle eyes 46, a pin 49 being fitted transversely through one of the said portions 48 so as to prevent accidental disengagement of the eyes 46 from the said portions 48. It will be apparent, however, that by removing the pin 49 and shifting the trough laterally in the direction in which the free ends of the portions 48 are presented, the trough may be dismounted for repair or cleaning.

As before stated, the grain after having been drained is dumped into a hopper arranged for the support of bags or sacks to receive the grain, and this hopper includes a forward wall 50 which extends between the ends 1 immediately rearwardly of the rear wall 5 of the tank and which is inclined downwardly and rearwardly, as clearly shown in Figs. 4 and 5 of the drawings. A rail 51 also extends between the ends 1 rearwardly of the wall 50 and in spaced relation thereto and is inclined downwardly and forwardly and spaced from the rear side of the said wall 50. A strip 52 is secured to the forward edge of the rail 51 and projects below the said rail and occupies a plane parallel to the wall 50. The strip 52 is formed at intervals with recesses 53 and the lower portion of the wall 50 is formed with recesses 54 located in alinement with the recesses 53. A number of division pieces 55 are secured between the wall 50 and strip 52 in the manner clearly shown in Figs. 1, 4 and 5 of the drawings and each division piece is formed in its under side with a recess 56 registering with corresponding recesses 53 and 54. The division pieces have their upper sides oppositely inclined or beveled, as at 57, so that the mass of grain deposited in the hopper will be divided by the said pieces 55. In advance of each recess 53, a hook 58 is secured to the under side of the rail 51 and spurs or hooks 59 project rearwardly from the wall 50 at points midway between the recesses 54 therein. By reference to Figs. 2, 4 and 5 of the drawings it will be observed that the sacks which are to receive the grain, and which are indicated by the reference character S, are to be engaged with the hooks 58 and spurs 59 with the edges of the mouth of each sack fitting within the recesses 53, 54 and 56. It will furthermore be apparent that by the arrangement above described, the hopper is provided with a number of spouts, each received within a bag to be filled and that waste of grain is in this manner prevented.

In order that the grain trough may be swung up to draining position and subsequently tilted to discharge its contents into the hopper, a lever 60 is pivotally mounted at its lower end in a bracket 61 at the upper side of the wall 50 of the hopper and has pivotally connected to it, as at 62, a rod or link 63 which at its other end is formed with a loop 64 engaging the loop 28. Connected to the upper end of the lever 60 is one end of a cable 65 constituting an element of any suitable hoisting or pulling block and tackle arrangement 66 having a clutch device 67 coöperating with the pull rope 68 of such device, to automatically clutch the same when the lever has been swung to the desired position.

In the operation of the device, assuming the trough to be in position within the tank, a suitable quantity of blue vitriol is placed within the trough and the proper quantity of water added thereto, or a solution of formaldehyde is poured into the trough. In the use of blue vitriol, the mixture is thoroughly stirred until the crystals have dissolved. In the use of either solution the grain is introduced thereinto and the whole thoroughly stirred so that all portions of the mass of grain will be subjected to the solution. After the stirring operation, the scum or smut which rises to the top of the solution is removed, as also any particles of foreign matter and imperfect grains, after which the rope 68 is pulled to swing the lever 60 so as to move the trough nearly to the position shown in Fig. 5 of the drawings. The trough is allowed to remain in this position until the solution has been properly drained from the grain, after which the rope is further pulled so as to move the trough to about the position shown in Fig. 5, in which position the grain will be discharged therefrom into the hopper and the mass of grain will be divided by the division pieces 55 and directed into the several sacks or bags supported by the said hopper. In the initial operation of the machine, the bags are allowed to remain upon the hopper until the operation above described has been repeated, up to and including the step of draining the grain, at which point the bags may be removed and others placed in position to receive the grain, when the trough is again tilted to discharging position.

If found desirable, hooks 58 may be located between the recesses 53 and in fact, the arrangement of these hooks and the spurs 59 may be varied in any manner desired. Also as a means for more firmly holding the bottom slats in place, a beveled strip or cleat 38' is secured to the inner side of the front wall 15 of the grain receiving trough and extends longitudinally above the ends of the said slats.

Having thus described the invention, what is claimed as new is:

1. In a grain treating machine, a tank, a trough within the tank movable to draining position with respect to the tank and a series of slats comprising one wall of the trough and slidably removable, and means yieldably bearing against one end of the series of slats whereby to yieldably resist expansion of the series.

2. In a grain treating machine, a tank, a trough within the tank movable to draining position with respect to the tank and a series of slats comprising one wall of the trough and slidably removable, and means yieldably bearing against one end of the series of slats whereby to yieldably resist expansion of the series, the said means being movable out of engagement with the slats whereby to permit of removal of the slats.

3. In a grain treating machine, a tank, a trough within the tank movable to draining position above the same, and a hopper having a plurality of independent discharge spouts and having division pieces dividing the said spouts and arranged to deflect grain discharged into the hopper simultaneously through the several spouts, and bag supporting means associated with the spouts.

4. In a grain treating machine, a tank, a trough within the tank movable to draining position with respect to the tank, the trough including ends, a front, a back and a bottom, the back of the trough including spaced rails having grooves, a series of slats slidably removably fitted at their ends in the grooves and having relatively spaced edge portions, the said front of the trough and the lower one of the rails having opposing grooves, and a series of slats fitted at their ends slidably and removably in the last-mentioned grooves and comprising the bottom of the trough.

In testimony whereof we affix our signatures in presence of two witnesses.

CHARLES R. HARLESS. [L. S.]
JASPER N. HARLESS. [L. S.]

Witnesses:
N. P. CAHILL,
J. M. DUNLAP.

Copies of this patent may be obtained for five cents each, by addressing the "Commissioner of Patents, Washington, D. C."